No. 607,206. Patented July 12, 1898.
M. ACKERMAN.
FLY BRUSH FOR SCREEN DOORS.
(Application filed June 12, 1897.)

(No Model.)

Witnesses
C. M. Bradway.
Victor J. Evans.

Inventor
Michael Ackerman.
By John Wedderburn
Attorney

THE NORRIS PETERS CO., PHOTO-LITHO., WASHINGTON, D. C.

UNITED STATES PATENT OFFICE.

MICHAEL ACKERMAN, OF HOWARD, SOUTH DAKOTA.

FLY-BRUSH FOR SCREEN-DOORS.

SPECIFICATION forming part of Letters Patent No. 607,206, dated July 12, 1898.

Application filed June 12, 1897. Serial No. 640,466. (No model.)

*To all whom it may concern:*

Be it known that I, MICHAEL ACKERMAN, of Howard, in the county of Miner and State of South Dakota, have invented certain new and useful Improvements in Fly-Brushes on Screen-Doors; and I do hereby declare the following to be a full, clear, and exact description of the invention, such as will enable others skilled in the art to which it appertains to make and use the same.

The invention relates to a fly-brush attachment for screen-doors for brushing flies from the door prior to opening the same and so guarding the room protected by the said door against the admittance of flies in the opening of the door. It will be understood from the following description and claims, reference being had to the accompanying drawings, in which—

Figure 1:
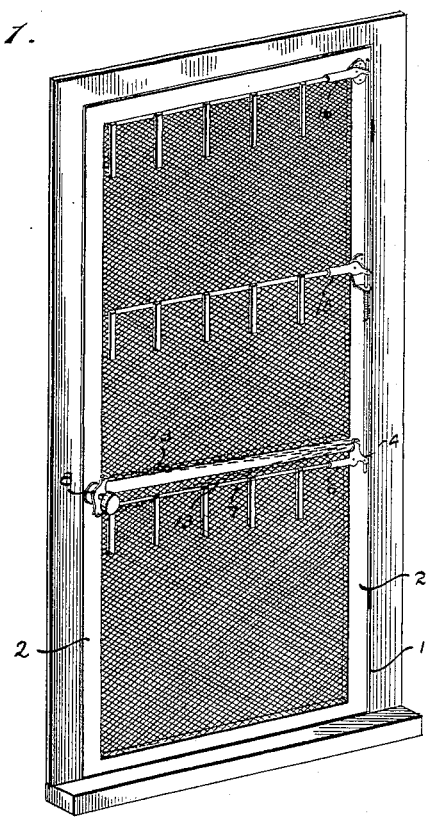
Figure 2:
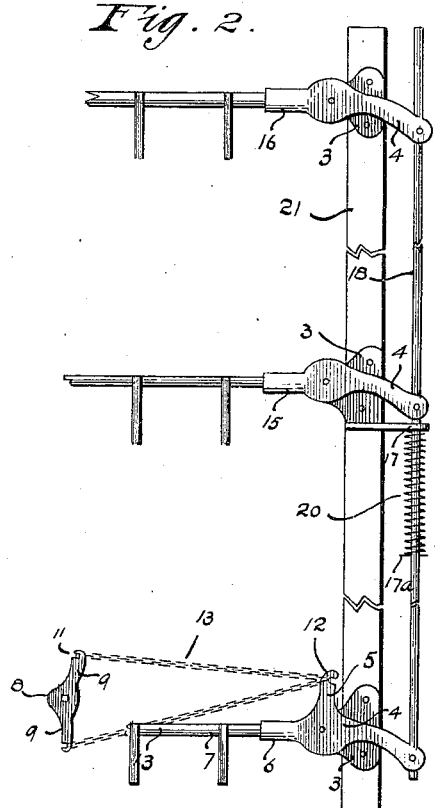
Figure 3:
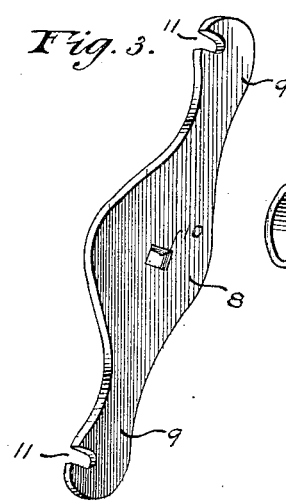
Figure 4:
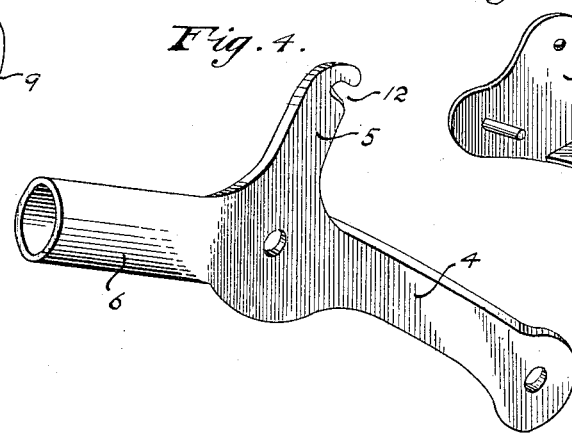
Figure 5:
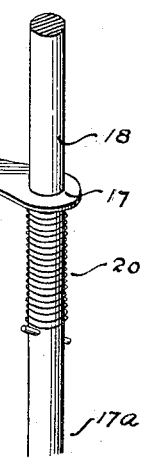

Figure 1 is a perspective view of a door and door-jamb, showing a series of brushes connected with the door and means for vibrating the same. Fig. 2 is a face or front view of the brush attachment and the brush-actuating device detached from the door and secured to a strip or slat designed to be secured to the door. Fig. 3 is a perspective view of a two-arm lever connected with the door-knob for operating the brush or brushes. Fig. 4 is a similar view of a three-arm brush-lever connected with the knob-lever and to the plate, to which said brush-lever is pivoted. Fig. 5 is a similar view of the brush pivot-plate and a spring on the brush-connecting rod for retracting the brushes into their normal position.

1 indicates a door-jamb, and 2 the door hinged to said jamb in any usual manner. The door is designed to be covered with wire-gauze or other usual material for forming a screen-door, and has secured to it on its upright frame-timber adjacent to the door-jamb 1 a series of plates 3, upon which are pivoted a series of brush-carrying arms. One of these arms, (indicated at 4,) adjoining the center cross-bar of the door-frame, is made in the form of a three-arm lever consisting of an upright arm 5, which is connected with a means for vibrating said lever and with a horizontal arm 6, made, preferably, in the form of a sleeve for the reception of the brush stem or handle 7, which is provided with a pendent brush of any suitable construction, that shown consisting of a series of strips pendent from the rod 7 and extending the entire length of said rod.

8 indicates a two-arm lever, with arms 9 9 extending on opposite sides thereof in substantially the vertical position shown in Fig. 3. It is provided on its central portion with a rectangular perforation 10, adapting it to engage the shank of the door-knob 14 inside of said knob, the knob serving to hold said lever in place upon the shank, or it may be otherwise made secure to the knob to be vibrated thereby. The ends of the arms 9 are provided with eyes or hook-shaped ends (indicated at 11) adapted to engage chains 13 13, connecting said arms with the upright arm 5 of the three-arm lever 4 in such manner that as the lever 8 is vibrated in either direction by the operation of the knob the lever 4 will be vibrated with it, and so will vibrate the brush 7 downward. In the drawings the door is shown provided with three of these brushes, each pivoted upon a plate 3, secured to the door-frame, the brush-holder arms being indicated at 15 and 16. The plate 3, in which the arm 15 is pivoted, is provided with a heel extension in which is formed an elongated slot or eye 17, which serves as a guide for the upright rod 18, connecting the heel extensions 19 of the brush-holder arms, as shown, so that as the arm 5 of the lower brush-arm is vibrated the holder-arms 15 and 16 will be vibrated simultaneously therewith and in the same direction. Between the arms 17 of the central plate 3 and a pin 17$^a$ in said rod is mounted a coil-spring 20, which by its tension serves to thrust the rod 18 downward and so to hold the brush-arms normally in the horizontal position.

The arm 5, like the arms 9 of the two-arm lever 8, may be provided with an eye or a hook-shaped socket 12 for the reception of the chains 13 13, engaging the two-arm knob-lever. This construction of the arms of the levers with hooks instead of eyes permits the ready adjustment of the chains or cords 13 for giving them at all times the desired tension.

In Fig. 2 I have shown the several parts of the brush attachment connected with a vertical strip 21 instead of connecting them directly with the door, as shown in Fig. 1. By this arrangement the brush attachment, instead of having its parts separately secured to the door, will have them secured to said longitudinal strip, which affords a means of ready and convenient attachment to the door. In this arrangement the plates 3, to which the brush-carrying arms are pivoted, will be riveted to the slot, as indicated. The number of these brush-arms and of the brushes connected therewith may of course be varied to suit the size of the door; but ordinarily three will be sufficient to sweep the entire length of the door from top to bottom, and as these brushes are pivoted near the hinged edge of the door and are arranged to swing downward simultaneously they will sweep the flies off from the swinging edge of the door, thereby rendering it difficult for them to gain access to the door while the same is being opened for permitting a person to pass in or out. The door will be provided with the usual spring for closing it and also with the usual spring-latch for holding it when closed and to necessitate the turning of the knob prior to the opening or closing of the door, and this under the construction described serves in the present instance to sweep the flies away from the door prior to the opening of the same. The brush-levers may of course be connected with an independent knob for operating it; but that described is preferred, as the door under such arrangement cannot be opened without first vibrating the brush herein described.

Having thus described the invention, what I claim as new, and desire to secure by Letters Patent, is—

1. In a brush attachment for screen-doors, the pivotally-mounted brush-carrying arm, means for connecting said brush-carrying arm to the door, a lever-arm connected to said brush, and means for connecting said lever-arm to the door-knob for actuating the brush, substantially as described.

2. The combination in a brush attachment to doors, of a two-arm lever connected with the door-knob and actuated thereby, and a brush-carrying arm pivotally connected with the door, said lever and brush-carrying arm being connected for operating the latter, substantially as described.

3. The combination with a door, of a brush pivotally connected with said door at or near its hinged edge, and a lever connected with the door-knob to be operated thereby, said lever being connected with the brush for actuating it, substantially as described.

4. In a brush attachment to doors, a series of connected brushes pivoted to the door, in combination with a lever connected with the door-knob and with said brushes for actuating them, substantially as described.

5. The combination with a screen-door, of a series of brushes, pivoted brush-carrying arms, a rod connecting said brush-arms, means connecting the said brush-arms to the lever actuating the door-knob, and a spring for retracting the brushes to their normal position after being operated by said door-knob, substantially as described.

In testimony whereof I have signed this specification in the presence of two subscribing witnesses.

MICHAEL ACKERMAN.

Witnesses:
C. A. CRISSEY,
F. D. MUMFORD.